Walker

United States Patent [19]

[11] 3,760,892

[45] Sept. 25, 1973

[54] AQUEOUS DRILLING FLUID AND METHOD OF USE THEREOF

[75] Inventor: Thad O. Walker, Houston, Tex.

[73] Assignee: Texaco Inc., New York, N.Y.

[22] Filed: June 26, 1972

[21] Appl. No.: 266,165

[52] U.S. Cl............... 175/65, 252/8.5 A, 252/8.5 C
[51] Int. Cl............................................. E21b 21/04
[58] Field of Search................. 252/8.5 A, 8.5 C; 175/65

[56] References Cited
UNITED STATES PATENTS

| | | | |
|---|---|---|---|
| 3,200,106 | 8/1965 | Dickson et al. | 252/8.5 C X |
| 3,024,236 | 3/1962 | Hughes | 252/8.5 C X |
| 3,524,813 | 8/1970 | Kolaian | 252/8.5 C |
| 3,531,408 | 9/1970 | Kolaian | 252/8.5 C |
| 3,535,238 | 10/1970 | Kolaian | 252/8.5 C |
| 3,535,239 | 10/1970 | Kolaian | 252/8.5 C |
| 3,586,628 | 6/1971 | Kolaian | 252/8.5 C |

*Primary Examiner*—Stephen J. Novosad
*Attorney*—Thomas H. Whaley et al.

[57] ABSTRACT

An aqueous drilling fluid dispersant and a method of drilling wells using said drilling fluid dispersant which comprises a substituted pyridine compound selected from the group consisting of 2,3-dihydroxypyridine, 5-chloro-2,3-dihydroxypyridine and mixtures thereof.

10 Claims, No Drawings

AQUEOUS DRILLING FLUID AND METHOD OF USE THEREOF

This invention relates to a novel aqueous drilling fluid for drilling wells through subsurface formations by means of well drilling tools, and particularly to such an aqueous well drilling fluid having improved dispersibility as a result of containing therein a novel dispersant as hereinafter more fully described. The invention is also concerned with a method of drilling wells employing the novel aqueous drilling fluid.

Drilling fluids, or muds as they are sometimes called, are slurries of clayey solids used in the drilling of wells for tapping underground collections of oil, gas, brine or water. Such fluids have a number of different functions, the most important of which are to assist in the removal of cuttings from the well, to seal off formations of gas, oil, or water which may be encountered at different levels, to lubricate the drilling tool and drill pipe which carries the tool, and to hold the cuttings in suspension in the event of shutdowns in drilling.

An ideal drilling fluid is a thixotropic colloidal system, i.e., a fluid which on agitation or circulation (as by pumping or otherwise), has a measurable relatively low viscosity and is free-flowing (not plastic), particularly at high temperatures; but when such agitation or circulation is halted, the fluid sets or gels. The rate of gel formation is such as to permit the cuttings to fall only a short distance before the gel structure is sufficiently strong to support them.

When such a drilling fluid having the proper viscosity, the proper gel rate and proper gel strength is circulated through a well bore, it has a sufficiently high viscosity to carry the cuttings and sand from the bottom of the hole to the surface and it has a gel rate such as to allow the cuttings and sand to settle in a settling pit. On standing in a quiescent state, it develops sufficient gel strength to prevent the settling of the cuttings, sand or weighting material, etc., in the well bore when it becomes necessary to discontinue circulation for any appreciable period of time. Such a fluid is also characterized by its ability to form a mud cake on the borehole wall, thereby assisting in sealing off the traversed formations and inhibiting so-called water loss, i.e., loss of water from the drilling fluid.

One of the principal problems in mud chemistry is the production of suitable drilling fluids having satisfactory dispersibility, and the necessary thixotropic properties discussed above.

In accordance with the present invention the problems of dispersibility in aqueous drilling fluids can be solved by incorporating in an aqueous drilling fluid as the dispersant a substituted pyridine compound selected from the group consisting of 2,3-dihydroxypyridine, 5-chloro-, 2,3-dihydroxypyridine and mixtures thereof.

It is known from the article appearing in Zhur. Priklad. Khim. 35, pages 638–647 (1962), "Organic Viscosity Reducers in Clay Solutions" by D. Tischenko and S. Fleisher (CA, 57, 2491g, 1962), that the ortho-dihydroxybenzene-sulfonic acids, the ortho-dihydroxy-alpha-toluenesulfonic acids and water-soluble salts thereof are viscosity-reducing agents in clay-laden drilling fluids whereas the corresponding meta- and para-dihydroxybenzenes including the corresponding sulfonic acid derivatives and water-soluble salts thereof are ineffective viscosity-reducing agents for aqueous drilling fluids.

The substituted pyridine compounds of the present invention may be added to an aqueous drilling fluid in amounts ranging from about 0.1 pound to about 10 pounds per barrel of drilling fluid. In general, it has been found that amounts less than 0.1 pound per barrel do not produce completely satisfactory results in terms of dispersing activity whereas amounts above 10 pounds per barrel are economically unattractive and no improved results are obtained therewith. A preferred range for the substituted pyridine compounds of the present invention is from about 0.25 to about 5 pounds per barrel of drilling fluid for most consistent results and efficiency.

The substituted pyridine compounds employed in the present invention are known compounds and the manner of their preparation is known in the art.

In the table, gel strength (Gels) is reported as determined by a shearometer in accordance with the procedure in the American Petroleum Institute publication RP–29, results being expressed either as pounds/100 square feet or as time in seconds for a tube to settle in the mud (after the mud has stood for zero time and for 10 minutes). If it settles in more than 60 seconds, shear is reported as pounds per 100 square feet. Yield Point (YP) is calculated by subtracting the Plastic Viscosity (PV) from the Fann Viscosity reading at 300 rpm. Plastic Viscosity (PV) is obtained by calculation, subtracting the Fann reading at 300 rpm from the 600 rpm reading. Apparent Viscosity (AV) is equal to one half of the Fann Viscosity reading obtained at 600 rpm. The fluidity of a mud can be back-calculated from these data, the results being expressed in Fann Viscosity at 600 rpm and 300 rpm for a direct reading viscosimeter.

The properties of the base mud are shown in the table.

The test data set forth in the following table indicate the advantages of the substituted pyridine compounds as the dispersants of the present invention in aqueous drilling fluids and demonstrate the beneficial results of same in improving the dispersibility of drilling fluids.

Representative physical properties of the drilling fluids both before and after addition of the substituted pyridine compounds of the present invention are shown in the table. In each example the amount of material or materials added to the base muds, if any, are shown, expressed in terms of pounds of material per barrel of drilling fluid.

TABLE

| Ex. | Type Mud | Amount and Type Dispersant | PV | YP. | Ap. Vis. Cpe. | pH |
|---|---|---|---|---|---|---|
|  | Base Mud |  | 8 | 74.5 | 45.7 | 8.8 |
| 1. | LpH$^{(1)}$ | 1.0A*20.5 | 23 | 32 | 9.5 |  |
|  | Base Mud |  | 12 | 76 | 50 | 8.8 |
| 2. | LpH$^{(1)}$ | 1.0B**34 | 20.5 | 44.3 | 9.5 |  |

(1) Low pH Mud
A* 2,3-dihydroxypyridine
B** 5-chloro-,2,3-dihydroxypyridine

The data in the above table show that the substituted pyridine compounds of the present invention are effective dispersants for aqueous drilling fluids.

Obviously, many modifications and variations of the invention as hereinbefore set forth may be made without departing from the spirit and scope thereof and, therefore, only such limitations should be imposed as are indicated in the appended claims.

I claim:

1. An aqueous drilling fluid containing clay solids and as the dispersant a substituted pyridine compound selected from the group consisting of 2,3-dihydroxypyridine, 5-chloro,-2,3-dihydroxypyridine and mixtures thereof, said substituted pyridine compound being present in the drilling fluid in an amount sufficient to impart a reduced viscosity thereto.

2. An aqueous drilling fluid as claimed in claim 1 wherein the substituted pyridine compound is 2,3-dihydroxypyridine.

3. An aqueous drilling fluid as claimed in claim 1 wherein the substituted pyridine compound is 5-chloro-,2,3-dihydroxypyridine.

4. An aqueous drilling fluid as claimed in claim 1 wherein the substituted pyridine compound is present in the drilling fluid in an amount of from 0.1 to 10 pounds per barrel of drilling fluid.

5. An aqueous drilling fluid as claimed in claim 4 wherein the substituted pyridine compound is present in the drilling fluid in an amount of from 0.25 to 5 pounds per barrel of drilling fluid.

6. In a method of drilling wells wherein the drilling fluid is passed through the well in contact with an earth formation during the drilling operation, the improvement which comprises contacting said earth formation with an aqueous drilling fluid containing clay solids and at least 0.1 pounds per barrel of drilling fluid of a substituted pyridine compound as the dispersant selected from the group consisting of 2,3-dihydroxypyridine, 5-chloro-,2,3-dihydroxypyridine and mixtures thereof, said substituted pyridine compound being present in the drilling fluid in an amount sufficient to impart a reduced viscosity thereto.

7. In a method of drilling wells as claimed in claim 6 wherein the substituted pyridine compound is 2,3-dihydroxypyridine.

8. In a method of drilling wells as claimed in claim 6 wherein the substituted pyridine compound is 5-chloro-,2,3-dihydroxypyridine.

9. In a method of drilling wells as claimed in claim 6 wherein the substituted pyridine compound is present in the drilling fluid in an amount of from 0.1 to 10 pounds per barrel of drilling fluid.

10. In a method of drilling wells as claimed in claim 6 wherein the substituted pyridine compound is present in the drilling fluid in an amount of from 0.25 to 5 pounds per barrel of drilling fluid.

* * * * *